United States Patent [19]

Moore et al.

[11] Patent Number: 4,488,449

[45] Date of Patent: Dec. 18, 1984

[54] CABLE MOUNTING AND ADJUSTMENT MEANS

[75] Inventors: Michael E. Moore, Aurora; Stamos I. Papasideris, Bristol, both of Ill.

[73] Assignee: Caterpillar Tractor Co., Peoria, Ill.

[21] Appl. No.: 932,236

[22] Filed: Aug. 9, 1978

Related U.S. Application Data

[63] Continuation of Ser. No. 675,025, Apr. 8, 1976, abandoned.

[51] Int. Cl.³ ............................................. F16C 1/10
[52] U.S. Cl. ........................... 74/501 R; 200/153 LA
[58] Field of Search ................. 74/473 R, 484, 501 R, 74/501 P, 502; 200/153 LA, 161

[56] References Cited

U.S. PATENT DOCUMENTS

| | | | |
|---|---|---|---|
| 1,273,615 | 7/1918 | Jacobs et al. | 74/501 |
| 2,109,870 | 3/1938 | Thwaits | 251/294 |
| 2,497,930 | 2/1950 | Creson | 74/484 |
| 2,639,337 | 5/1953 | Framhein | 200/153 LA |
| 2,790,863 | 4/1957 | Towle | 200/161 |
| 2,861,465 | 11/1958 | Winkle et al. | 74/484 |
| 2,989,877 | 6/1961 | Iavelli | 74/501 |
| 3,003,360 | 10/1961 | Fodrea | 74/473 |
| 3,362,249 | 1/1968 | Richoux | 74/501 |
| 3,429,197 | 2/1969 | Loewenstern | 74/502 |
| 3,643,523 | 2/1972 | Mhaila | 74/502 |
| 3,838,607 | 10/1974 | Hemens | 74/501 R |
| 3,885,448 | 5/1975 | Beals et al. | 74/501 |
| 4,034,622 | 7/1977 | Deck | 74/501 R |

Primary Examiner—Kenneth Dorner
Attorney, Agent, or Firm—Phillips, Moore, Lempio & Finley

[57] ABSTRACT

An operator-controlled lever is adapted to actuate a push-pull cable for reciprocating the valve spool of a transmission control. A bracket is detachably mounting on a housing of the transmission control and is threadably mounted on a sheath of the cable. Upon assembly, the cable is first attached to the spool and then the bracket is threaded inwardly against the housing of the transmission control and attached thereto.

2 Claims, 4 Drawing Figures

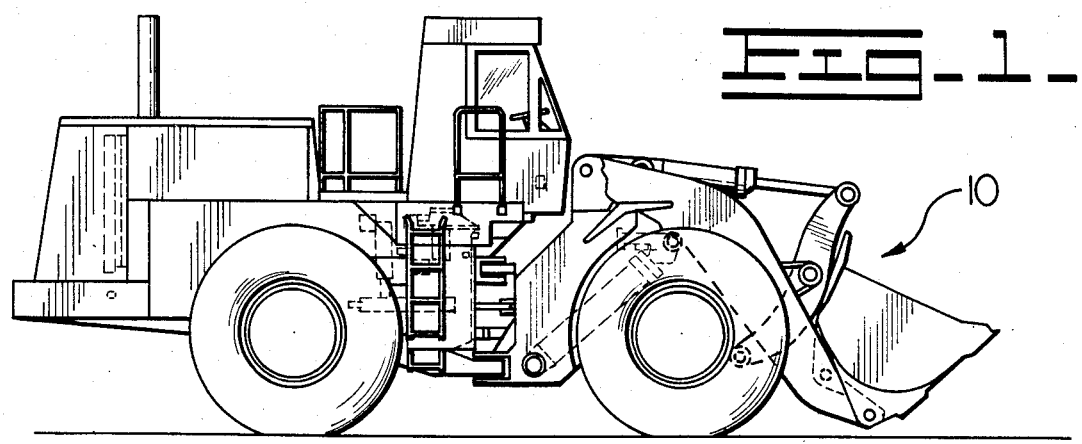
Fig_1_
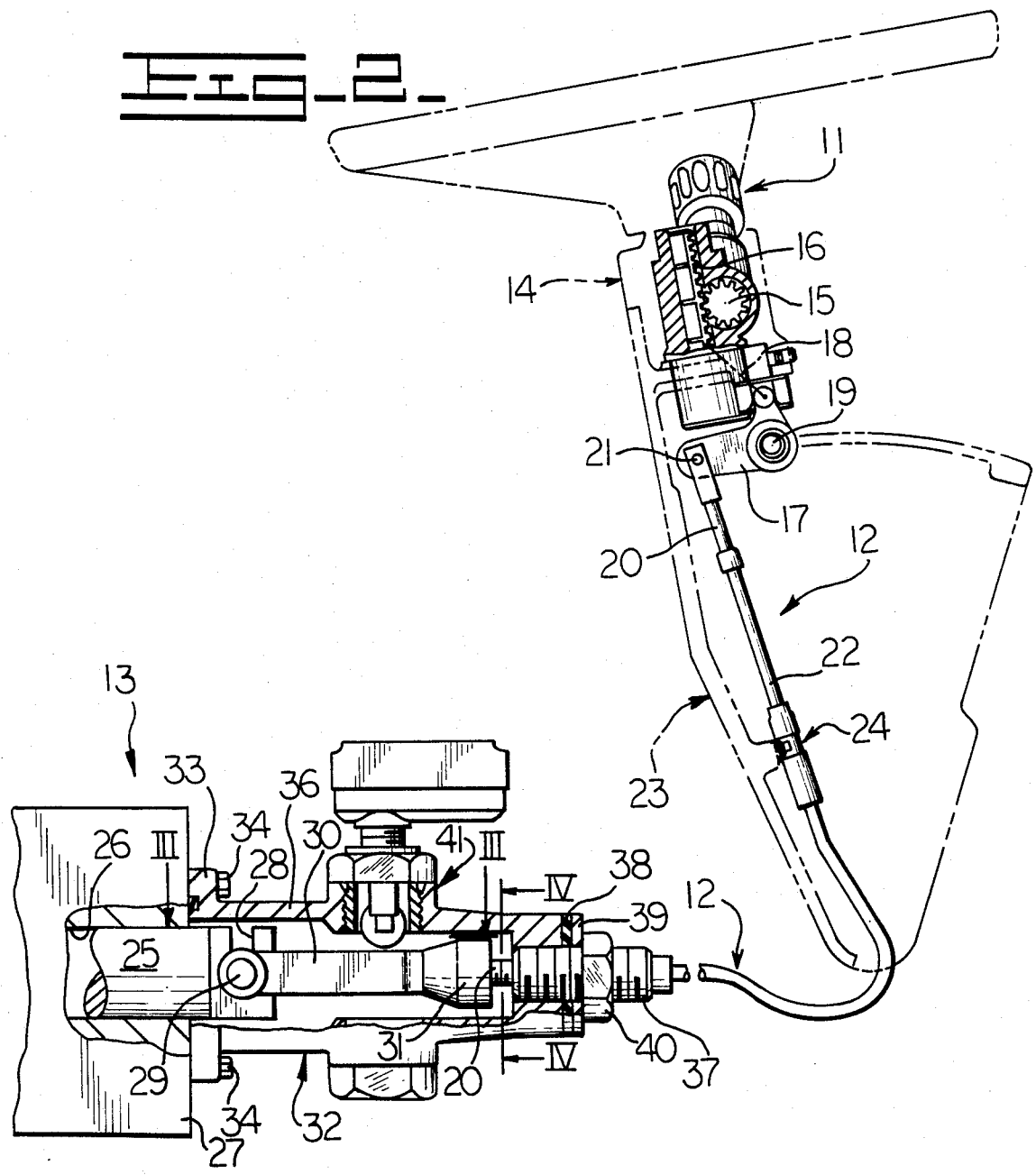
Fig_2_

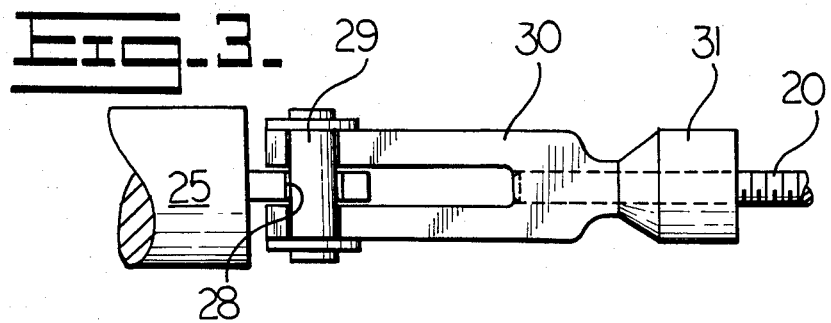
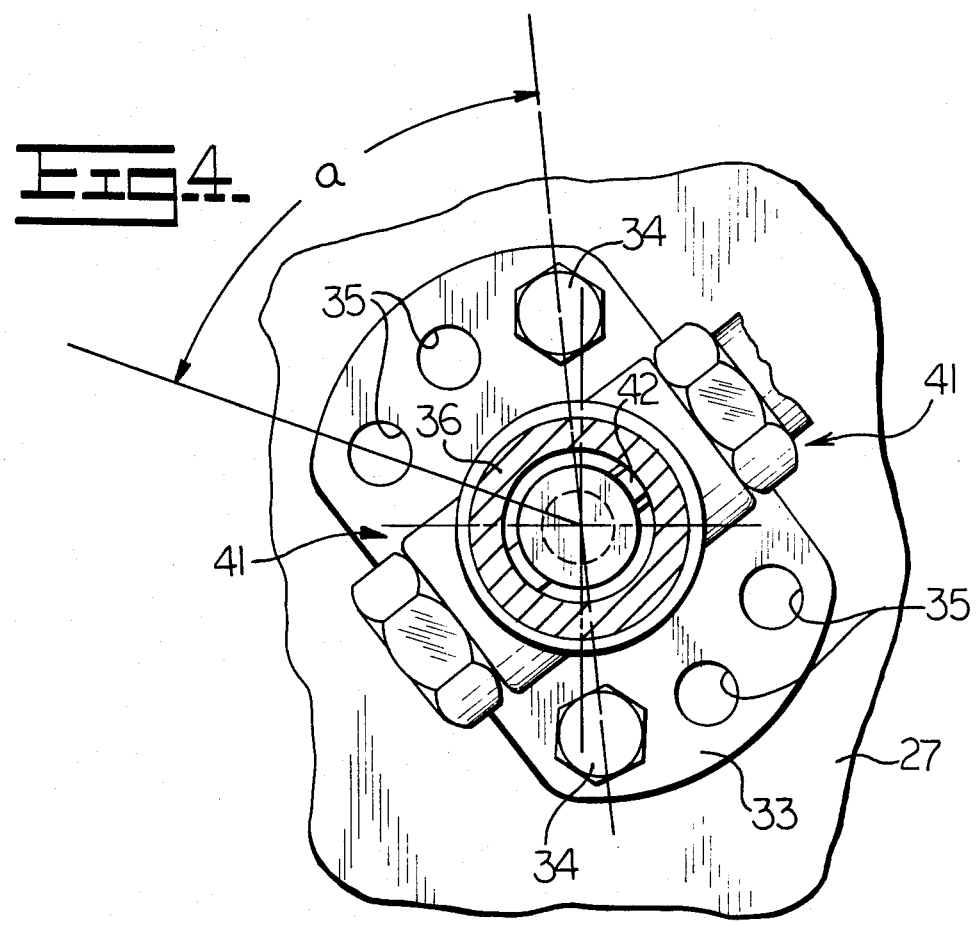

CABLE MOUNTING AND ADJUSTMENT MEANS

This is a continuation of Ser. No. 675,025, filed Apr. 8, 1976, now abandoned.

BACKGROUND OF THE INVENTION

Cable controls for the valve spools of transmissions and the like are normally connected to the valve spools by linkage means, including interconnected bellcranks and levers. In addition to the obvious complexity and cost of such controls, manufacturing tolerances must be closely held during assembly to precisely position the valve spools relative to the actuating levers therefor. In addition, means must be provided for mounting and guiding the cable adjacent to the housing of the transmission control.

SUMMARY OF THIS INVENTION

This invention is directed to a cable-controlled apparatus comprising a housing, a control member reciprocally mounted in the housing and having a slot formed therein, and flexible push-pull cable means connected to the control member for selectively reciprocating the same. The cable means is connected to the control member by a pin removably disposed in the slot and secured between bifurcated arms of a clevis threadably mounted on the cable means for adjusting the axial position of the pin relative to the slot. A bracket has a flange formed integrally therewith to be detachably mounted on the housing by at least one completely removable fastening means. An adjustment means, including interengaging screw threads threadably mounting the bracket on the cable means, adjustably mounts the bracket on the cable means directly for movement towards and away from the housing. The apparatus and method of this invention find particular application for hydraulic transmission controls and the like.

BRIEF DESCRIPTION OF THE DRAWINGS

Other objects of this invention will become apparent from the following description and accompanying drawings wherein:

FIG. 1 is a side elevational view of a construction vehicle employing the cable mounting and adjustment means of this invention thereon;

FIG. 2 is a side elevational view of the cable mounting and adjustment means, shown removed from the vehicle;

FIG. 3 is a sectional view, taken in the direction of arrows III—III in FIG. 2; and FIG. 4 is a top plan view, taken in the direction of arrows IV—IV in FIG. 2.

DETAILED DESCRIPTION

FIG. 1 illustrates an articulated wheel-type loader 10 having an engine and transmission control suitably mounted thereon in a conventional manner (not shown). FIG. 2 schematically illustrates a steering and transmission control system for the vehicle, including a transmission control lever 11 mounted thereon. The lever is operatively connected to a flexible push-pull cable means 12 for effecting speed changes of a transmission control 13 upon rotation of the control lever on a steering column 14.

Although the mechanism for translating rotary movements of the control lever to reciprocal movements of the cable means is not part of this invention, per se, a very brief description thereof would appear in order. In particular, a lower end of the control lever has a pinion gear 15 secured thereon which meshes with a rack 16 to reciprocate the same upon rotation of the control lever. The rack is mechanically connected to the first end of a bellcrank 17 by a linkage, schematically illustrated at 18, to pivot the bellcrank about a fixed pin 19 upon reciprocation of the rack.

A second end of the bellcrank is pivotally connected to a flexible cable 20 of cable means 12 by a pin 21. A sheath 22 of the cable means is secured on a mounting structure 23 of the vehicle by a bracket 24. From the above brief description it can be seen that rotation of control lever 11 in either direction will function to reciprocate cable 20 in sheath 22 to thus, in turn, reciprocate a valve spool or control member 25 of transmission control 13.

Valve spool 25 is reciprocally mounted in a bore 26 formed in a housing 27 of the transmission control and has a notch 28 formed on an outer end thereof. The spool may be reciprocated in response to rotation of control lever 11 to effect speed changes of the transmission or to place it in a forward or reverse gear mode of vehicle operation. It will become obvious from the description following hereinafter that the cable mounting and adjusting means of this invention is adapted to be used with control members other than the valve spool of a transmission control.

Referring to FIG. 3, a pin 29 is removably disposed in groove 28 and has its outer ends releasably connected to laterally spaced and bifurcated arms of a clevis 30. The clevis is threadably attached to cable 20 to provide adjustment means for disposing pin 29 in proper alignment within groove 28 of the spool. A combined lock nut and cam 31 is threadably mounted on the cable to secure the clevis in a preset axial and rotative position thereon.

Referring to FIGS. 2 and 4, a mounting bracket 32 comprises a flat mounting flange 33 detachably mounted on housing 21 by a pair of releasable fastening means or bolts 34. Two additional mounting holes 35 are formed through the flange in circumferentially disposed relationship relative to spool 25. The three holes thus provide adjustment means whereby bracket 32 can be rotated through an angle a, approximating 65° in FIG. 4, to attach the bracket on housing 27 at three different rotative positions thereon.

Bracket 32 further comprises a tubular enclosure 36 extending outwardly from flange 33 to enclose and protect spool 25 and its connection with cable 20. Sheath 22 of cable means 12 has a coupling member 37 secured thereon which is threadably mounted on the end of enclosure 36 to provide adjustment means at the interengaging screw threads thereof. An annular elastomeric seal 38 and a metallic washer 39 are mounted on coupling 37 and locked in place against enclosure 36 by a lock nut 40. Thus it can be seen that bracket 32 not only reciprocally mounts cable 20 thereon but also provides means for sealing and protecting valve spool 25.

If so desired, one or more switch assemblies 41 can be detachably mounted on bracket 32 to provide sensing means responsive to reciprocal movement of cable means 12. For example, a roller 42 mounted on a plunger of a microswitch of each switch assembly may be exposed internally of enclosure 36 to be activated electrically upon its tripping engagement with the cam portion of lock nut 30 to, in turn, activate a remote light or buzzer mounted in the operator's cab of the vehicle.

The switch assembly could thus be utilized to alert the operator that the transmission has been placed in a particular gear, for example.

Upon assembly of the above-described cable mounting and adjustment means, lock nut 40, along with seal 38 and washer 39, would be backed-off to a position rightwardly from that shown in FIG. 2. In addition, it is assumed that bolts 34 have been released to thus detach bracket 32 from housing 27 and that pin 29 has been removed from slot 28. In addition, it is further assumed that valve spool 25 has been moved to a selected gear position which corresponds to the preset rotative position of control lever 11.

The backing-off of lock nut 40, permitting bracket 32 to be positioned substantially rightwardly from the position shown in FIG. 2, will allow the workman to threadably adjust clevis 30 on the threaded end of rod 20. Thus, pin 29 may be precisely disposed in slot 28 to accurately position valve spool 25 relative to the reset position of control lever 11. Lock nut and cam 31 is then threaded into abutting relationship with the end of clevis 30 to lock the clevis in position thereon.

Bracket 32 is then threaded leftwardly on coupling 37 to abut flange 33 of the bracket in flush relationship against housing 27. Bolts 34 are then turned-down to secure the flange to the housing in one of the three adjusted positions illustrated in FIG. 4. It should be noted that the disposition of bracket 32 relative to spool 25 affords a limited clearance therebetween to thus entrap and prevent inadvertent dislodgement of pin 29 from slot 28.

We claim:

1. A cable-controlled apparatus comprising
   a housing,
   a control member reciprocally mounted in said housing and having a slot formed therein,
   flexible push-pull cable means connected to said control member for selectively reciprocating the same, said cable means being connected to said control member by a pin attached to said cable means and removably disposed in said slot and said pin being secured between bifurcated arms of a clevis, said clevis being threadably mounted on said cable means for adjusting the axial position of said pin relative to said slot,
   a bracket having a flange formed integrally therewith and detachably mounted on said housing by at least one releasable fastening means extending through said flange for securing said flange directly to said housing and mounting said cable means thereon, and
   adjustment means adjustably mounting said bracket on said cable means directly for movement towards and away from said housing, upon complete removal of said fastening means from said housing, comprising interengaging screw threads threadably mounting said bracket on said cable means for adjusted axial movements relative thereto and to the housing.

2. The apparatus of claim 1 further comprising a lock nut threadably mounted on said cable and abutting an end of said clevis to lock said clevis in place on said cable means.

* * * * *